United States Patent
Thakur et al.

(10) Patent No.: US 11,455,113 B2
(45) Date of Patent: Sep. 27, 2022

(54) RESTORATION OF WARM AND COLD DATA BLOCKS BASED ON STORAGE TIME BY BATCHES

(71) Applicant: Druva Inc., Sunnyvale, CA (US)

(72) Inventors: Pallavi Thakur, Pune (IN); Somesh Jain, Pune (IN); Nishant Thorat, Pune (IN); Sudeep Jathar, Pune (IN); Mohit Belsare, Pune (IN)

(73) Assignee: Druva Inc., Sunnyvale, CA (US)

( * ) Notice: Subject to any disclaimer, the term of this patent is extended or adjusted under 35 U.S.C. 154(b) by 0 days.

(21) Appl. No.: 17/152,279

(22) Filed: Jan. 19, 2021

(65) Prior Publication Data
US 2022/0147259 A1    May 12, 2022

(30) Foreign Application Priority Data
Nov. 10, 2020  (IN) .............................. 202041049008

(51) Int. Cl.
*G06F 3/06* (2006.01)
(52) U.S. Cl.
CPC ............ *G06F 3/0647* (2013.01); *G06F 3/064* (2013.01); *G06F 3/0619* (2013.01); *G06F 3/0673* (2013.01)
(58) Field of Classification Search
CPC ...... G06F 3/0647; G06F 3/0619; G06F 3/064; G06F 3/0673

USPC ....... 711/162, 161, 165; 707/654; 369/30.01
See application file for complete search history.

(56) References Cited

U.S. PATENT DOCUMENTS

| | | | |
|---|---|---|---|
| 2021/0064250 A1* | 3/2021 | Neff | G11B 5/00813 |
| 2021/0216407 A1* | 7/2021 | Borate | G06F 11/1453 |
| 2022/0092022 A1* | 3/2022 | Agarwal | G06F 16/113 |

\* cited by examiner

*Primary Examiner* — Hong C Kim
(74) *Attorney, Agent, or Firm* — Fenwick & West LLP

(57) ABSTRACT

A data restoration system including a data management server. The data management server receives one or more data restoration requests for restoring a plurality of data blocks. The data management server determines, based on metadata associated with the data blocks, a first subset of warm data blocks corresponding to warm-tier data and a second subset of cold data blocks corresponding to cold-tier data. The data management server retrieves the warm data blocks in the first subset and restores the warm data blocks in the first subset. The data management server groups the cold data blocks based in part on storage times of the cold data blocks to generate a plurality of cold-tier data retrieval requests. The data management server retrieves the cold data blocks by batches, each batch corresponding to one of the cold-tier data retrieval requests. The data management server restores the cold data blocks in the second subset.

20 Claims, 7 Drawing Sheets

400

```
┌─────────────────────────────────────────────────────────────┐
│ Receive one or more data restoration requests for restoring │
│                 a plurality of data blocks                  │
│                            410                              │
└─────────────────────────────────────────────────────────────┘
                              │
                              ▼
┌─────────────────────────────────────────────────────────────┐
│ Determine a first subset of warm data blocks corresponding  │
│ to warm-tier data and a second subset of cold data blocks   │
│            corresponding to cold-tier data                  │
│                            420                              │
└─────────────────────────────────────────────────────────────┘
                              │
                              ▼
┌─────────────────────────────────────────────────────────────┐
│         Retrieve the warm data blocks in the first subset   │
│                            430                              │
└─────────────────────────────────────────────────────────────┘
                              │
                              ▼
┌─────────────────────────────────────────────────────────────┐
│         Restore the warm data blocks in the first subset    │
│                            440                              │
└─────────────────────────────────────────────────────────────┘
                              │
                              ▼
┌─────────────────────────────────────────────────────────────┐
│ Group the cold data blocks based in part on storage times   │
│ of the cold data blocks to generate a plurality of cold-tier│
│                    data retrieval requests                  │
│                            450                              │
└─────────────────────────────────────────────────────────────┘
                              │
                              ▼
┌─────────────────────────────────────────────────────────────┐
│ Retrieve the cold data blocks by batches, each batch        │
│ corresponding to one of the cold-tier data retrieval        │
│                        requests                             │
│                            460                              │
└─────────────────────────────────────────────────────────────┘
                              │
                              ▼
┌─────────────────────────────────────────────────────────────┐
│        Restore the cold data blocks in the second subset    │
│                            470                              │
└─────────────────────────────────────────────────────────────┘
```

*FIG. 4*

RESTORATION OF WARM AND COLD DATA BLOCKS BASED ON STORAGE TIME BY BATCHES

CROSS REFERENCE TO RELATED APPLICATIONS

This application claims the benefit of priority to Indian Provisional Patent Application No. 202041049008, filed Nov. 10, 2020, which is incorporated herein by reference in its entirety for all purposes.

TECHNICAL FIELD

The disclosed embodiments are related to data management systems, and, more specifically, to data management servers that may restore data from different storage tiers.

BACKGROUND

To protect against data loss, organizations may backup data to a backup system. In some cases, the backup data may be stored in various data locations. As an organization tries to restore the backup data, the data often needs to be retrieved from more than one data store. For a large amount of data, certain data stores may impose various rules and restrictions on data retrieval that may cause delay or increase the costs of a data backup process. As such, the restoration of backup data may prove inefficient and unsatisfactory, particularly from the end user perspective.

BRIEF DESCRIPTION OF THE DRAWINGS

FIG. 4 is a flowchart depicting an example process for restoring data from different storage tiers in a data management system, in accordance with an embodiment.

Figure 1:
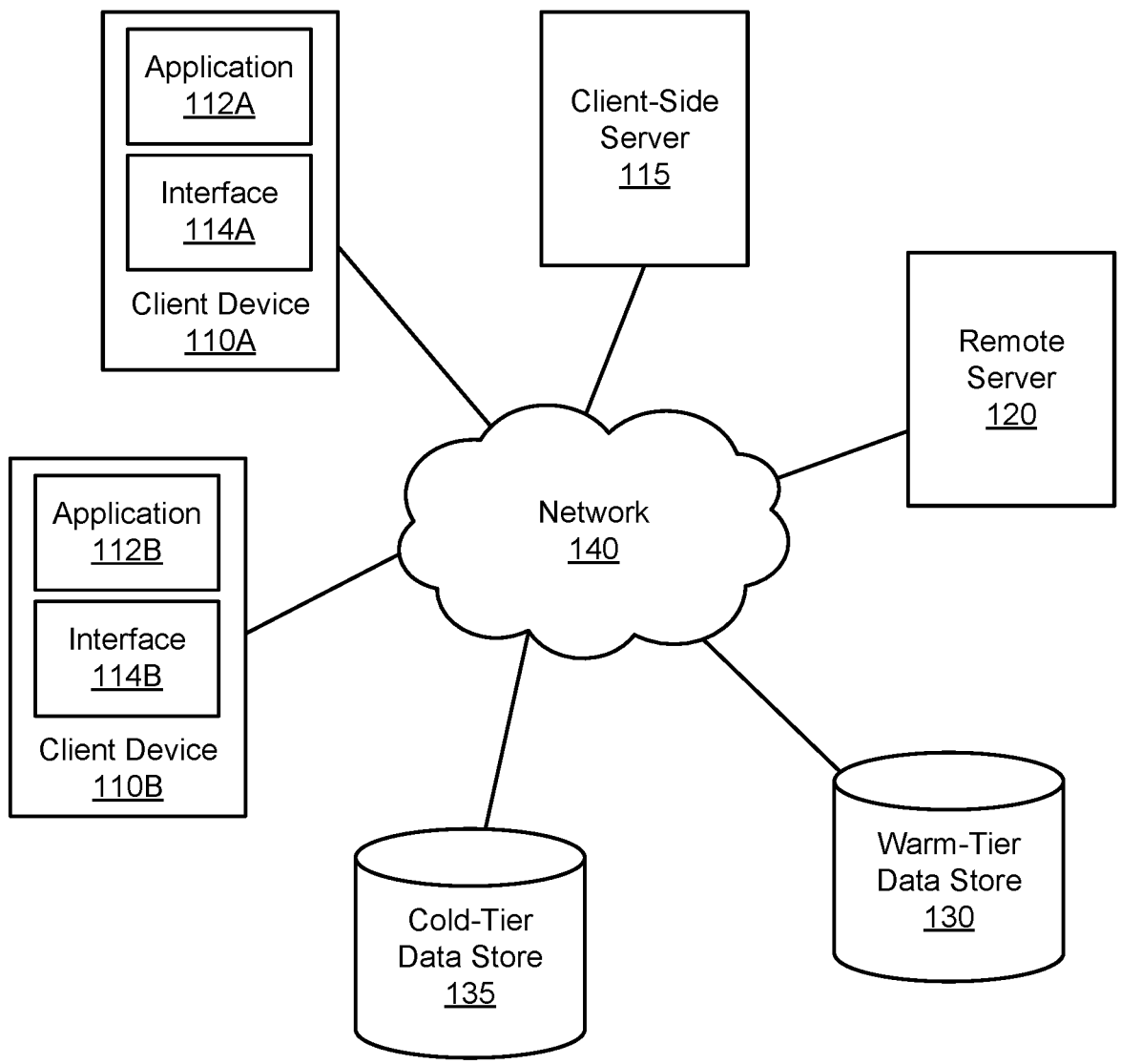
FIG. 1 is a block diagram illustrating an environment of an example data management system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed are example embodiments related to systems and processes of data retrieval and/or restorations that improve the efficiency and cost of performing such operations. A plurality of backup snapshots that capture states of devices at different times may periodically be generated and sent to data stores for storage. At any point in time, users of the devices may want to restore one or more of the backup snapshots. For example, in order to restore a backup snapshot, a request may be provided to one or more data management servers to restore the backup snapshot.

Files included within the backup snapshot may have been divided up into data blocks during backup and stored in one or more data stores. For example, some data blocks may be stored in a warm-tier storage and other, usually older, data blocks may be stored in a cold-tier storage. Warm-tier storage may allow for almost instantaneous restoration of data. Cold-tier storage may involve significant time delays in the restoration of data. Also, the number of data retrieval requests provided to a cold-tier storage may be limited within a given time period. As such, data management servers may manage data restoration requests accordingly to successfully and efficiently restore data blocks from multiple storage tiers to clients.

In an example embodiment, a data management server may process data restoration requests by determining which data blocks to be retrieved are currently being stored in warm-tier storage and which data blocks are currently being stored in cold-tier storage. For data blocks currently being stored in warm-tier storage (e.g., warm data blocks), the data management server may retrieve and restore the data blocks almost immediately. For data blocks currently being stored in cold-tier storage (e.g., cold data blocks), the data management server may group the cold data blocks by storage time (e.g., when the cold data block was stored in cold-tier storage) and batch the data retrieval requests according to the groups. The data management server decreases the number of data retrieval requests provided to cold-tier storage and retrieves cold data blocks in batches. The cold data blocks can then be restored to the clients.

Example System Environment

Referring now to FIG. (Figure) 1, a block diagram that illustrates an environment of an example system environment 100 is shown, in accordance with an embodiment. By way of example, the system environment 100 may include one or more client devices, e.g., 110A, 110B, etc. (collectively referred to as client devices 110 or a client device 110), one or more client-side servers 115, one or more remote servers 120, one or more warm-tier data stores 130, and one or more cold-tier data stores 135. In various embodiments, the system environment 100 may include fewer and additional components that are not shown in FIG. 1. For example, the system environment 100 may include only the client devices 110, the remote servers 120, and the data stores 130 and 135. In this example, a remote server 120 may perform similar operations to a client-side server 115 as described below. Both the client-side server 115 and the remote server 120 may be referred to as a data management server.

The various components in the system environment 100 may each correspond to a separate and independent entity or some of the components may be controlled by the same entity. For example, in one embodiment, a remote server 120 and one or more data stores 130 and 135 may be controlled and operated by the same data storage provider company while each client device 110 and/or client-side server 115 may be controlled by an individual client. In another embodiment, a remote server 120 and the data stores 130 and 135 may be controlled by separate entities. For example, the remote server 120 may be an entity that utilizes various popular cloud data service providers as data stores 130 and 135. The components in the system environment 100 may communicate through the network 140. In some cases, some of the components in the environment may also communicate through local connections. For example, the remote server 120 and a warm-tier data store 130 may communicate locally. In one embodiment, the remote server 120 may be a cloud backup service provider server that is in communication with multiple client-side servers 115. Each client-side server may be a computing server operated by an organization (e.g., information technology (I.T.) department of the organization) that manages data for various client devices controlled by the organization.

While some of the components in the system environment 100 may at times be described in a singular form while other components may be described in a plural form, the system environment 100 may include one or more of each of the components. For simplicity, multiple instances of a type of entity or component in the system environment 100 may be referred to in a singular form even though the system may include one or more such entities or components. For example, in one embodiment, with the client-side server 115, the remote server 120 may be a service provider that serves multiple organizations, each of which may have a client-side server 115. Conversely, a component described in the plural form does not necessarily imply that more than one copy of the component is always needed in the environment 100.

A client device 110 may be a computing device that can transmit and/or receive data via the network 140. Users may use the client device to perform functions such as accessing, storing, creating, and modifying files, accessing digital content, and executing software applications. A client device 110 may send a request to store, read, search, delete, modify, and/or restore data stored in one or more data stores 130 and 135. Data of a client device 110 may be captured as one or more snapshots of the client device 110 and be stored in one or more data stores 130 and 135. The client also may be referred to as a user or an end user of the remote server 120. The client device 110 also may be referred to as a user device or an end user device. The client devices 110 in the system environment 100 may belong to different organizations (e.g., different companies). Those client devices 110 may be in communication with the remote server 120, directly or through the client-side server 115, as customers of the entity operating the remote server 120.

Each client device 110 may include one or more applications 112 (individually referred to as 112A, 112B, etc., and collectively referred to as applications 112 or an application 112) and one or more user interfaces 114 (individually referred to as 114A, 114B, etc., and collectively referred to as user interfaces 114 or a user interface 114). The client devices 110 may be any computing devices. Examples of such client devices 110 include personal computers (PC), desktop computers, laptop computers, tablets (e.g., iPADs), smartphones, wearable electronic devices such as smartwatches, or any other suitable electronic devices. The clients may be of different natures such as including individual end users, organizations, businesses, and other clients that use different types of client devices that run on different operating systems.

The applications 112 may be any suitable software applications that operate at the client devices 110. The applications 112 may be of different types. In one case, an application 112 may be a web application that runs on JavaScript or other alternatives, such as TypeScript, etc. In the case of a web application, the application 112 cooperates with a web browser to render a front-end user interface 114. In another case, an application 112 may be a mobile application. For example, the mobile application may run on Swift for iOS and other APPLE operating systems or on Java or another suitable language for ANDROID systems. In yet another case, an application 112 may be a software program that operates on a desktop computer that runs on an operating system such as LINUX, MICROSOFT WINDOWS, MAC OS, or CHROME OS.

In one embodiment, an example application 112 may be provided and controlled by the remote server 120. For example, the company operating the remote server 120 may be a data storage service provider that provides a front-end software application that can be installed, run, or displayed at a client device 110. The application 112 provided by the remote server 120 may automatically perform or allow the user to perform various data management tasks such as capturing one or more snapshots of a device, scheduling capturing of snapshots, facilitating manual backup, uploading, downloading of files, and other data management and restoration tasks. The applications 112 provided by the remote server 120 may take various forms such as software as a service (SaaS), downloadable applications, free applications, etc. In one case, an example application 112 may be installed at a client device 110 as a background application that performs periodic backup operations and provides additional task options when its user interface 114 is launched. In another case, an application 112 is published and made available by the company operating the remote server 120 at an application store (App store) of a mobile operating system. In yet another case, an end user may go to the company's website and launch a web application for various data management tasks such as backup or snapshot management.

The user interfaces 114 may be any suitable interfaces for receiving inputs from users and for communication with users. When a client device 110 attempts to perform a data management task, the user may communicate to the application 112, the client-side server 115, and/or the remote server 120 through the user interface 114. The user interface 114 may take different forms. In one embodiment, the user interface 114 may be a web browser such as CHROME, FIREFOX, SAFARI, INTERNET EXPLORER, EDGE, etc. and the application 112 may be a web application that is run by the web browser. In another application, the user interface 114 is part of the application 112. For example, the user interface 114 may be the front-end component of a mobile application or a desktop application. The user interface 114 also may be referred to as a graphical user interface (GUI) which includes graphical elements to display files such as spreadsheets. In another embodiment, the user interface 114 may not include graphical elements but may communicate with the remote server 120 via other suitable ways such as application program interfaces (APIs).

A client-side server 115 is a data management server that includes one or more computing devices to manage data transmissions between the client devices 110, the remote server 120, and/or the data stores 130 and 135. In one embodiment, the client-side server 115 may be an intermediate server that cooperates with the remote server 120 to provide data manager services to the client devices 110 within an organization. For example, a client-side server 115 may be a server operated by the I.T. department of an organization to manage various client devices 110 within the organization. The client-side server 115 may also include a version of application 112 and interface 114, which are provided by the remote server 120 for communication with the remote server 120 and manage data based on the architecture and protocols (e.g., data backup, data retrieval and restoration protocols) set forth by the remote server 120. In this disclosure, client-side servers 115 may collectively and singularly be referred to as a client-side server 115, even though each client-side server 115 may include multiple computing devices. For example, the client-side server 115 may be a pool of computing devices that may be located at the same geographical location (e.g., a server room) as the client devices 110. A computing device of the client-side server 115 may take the form of software, hardware, or a combination thereof (e.g., some or all of the components of a computing machine of FIG. 6). For example, parts of the client-side server 115 may be a PC, a tablet PC, a smartphone, an internet of things (IoT) appliance, or any machine capable of executing instructions that specify actions to be taken by that machine. Parts of the client-side server 115 may include one or more processing units (e.g., a central processing unit (CPU), a graphics processing unit (GPU), a digital signal processor (DSP), a controller, a state machine, one or more ASICs, one or more RFICs, or any combination of these) and a memory.

A remote server 120 is a data management server that manages data of client devices 110 by backing up the data in one or more data stores 130 and 135. For example, the remote server 120 may be operated by a cloud data management provider. The remote server 120 may provide data management services to multiple organizations (e.g., customers of the remote server 120). Some of the organizations may have a client-side server 115 set up with the remote server 120. In various embodiments, the remote server 120 may be in direct communications with client devices 110 in some cases and primarily in communication with the client-side server 115 in other cases. In this disclosure, remote servers 120 may collectively and singularly be referred to as a remote server 120, even though the remote server 120 may include more than one computing device. For example, the remote server 120 may be a pool of computing devices that may be located at the same geographical location or distributed geographically (e.g., cloud computing, distributed computing, or in a virtual server network). A computing device of the remote server 120 may take the form of software, hardware, or a combination thereof (e.g., some or all of the components of a computing machine of FIG. 6). For example, parts of the remote server 120 may be a PC, a tablet PC, a smartphone, an internet of things (IoT) appliance, or any machine capable of executing instructions that specify actions to be taken by that machine. Parts of the remote server 120 may include one or more processing units (e.g., a central processing unit (CPU), a graphics processing unit (GPU), a digital signal processor (DSP), a controller, a state machine, one or more ASICs, one or more RFICs, or any combination of these) and a memory.

The warm-tier data store 130 and the cold-tier data store 135 (collectively may be simply referred to as data stores 130 and 135) may include one or more storage units such as memory that may take the form of non-transitory and non-volatile computer storage medium to store various data. In some cases, one or more data stores 130 and 135 may communicate with other components by the network 140. Those data stores 130 and 135 may also be referred to as cloud storage servers. Example cloud storage service providers may include AMAZON AWS, DROPBOX, RACKSPACE CLOUD FILES, AZURE BLOB STORAGE, GOOGLE CLOUD STORAGE, etc. In other cases, instead of cloud storage servers, one or more data stores 130 and 135 may be storage devices that are controlled and locally connected to a data management server such as a client-side server 115 or the remote server 120. For example, those data stores 130 and 135 may be memory (e.g., hard drives, flash memory, discs, tapes, etc.) utilized by a client-side server 115.

A data store 130 or 135 may be a distributed system that distributes data among different nodes to provide better data access and operation in case of a failure or offline of one or more nodes. In one embodiment, such a data store may be a NoSQL database server. The data store may be used for data deduplication purposes. Fingerprints of data may be created as the deduplication indices of the data. For more details about how a data store may operate as a distributed system with the deduplication indices, U.S. Pat. No. 8,996,467, patented on Mar. 31, 2015, entitled "Distributed Scalable De-Duplicated Backup Management System" is incorporated herein by reference for all purposes.

Various data stores 130 and 135 may use different data storage architectures to manage and arrange the data. For example, in some cases, one or more data stores 130 and 135 may manage data as a file hierarchy or with sectors and tracks. In some embodiment, one or more data stores 130 and 135 may take the form of an object storage system, such as AMAZON S3 and AMAZON GLACIER. Object storage (also known as object-based storage) may be a computer data storage architecture that manages data as objects, as opposed to other storage architectures like file storage which manages data as a file hierarchy. Each object may typically include the data of the object itself, a variable amount of metadata of the object, and a unique identifier that identifies the object. The unique identifier may take the form of a fingerprint (e.g., checksum) of the underlying data of the object itself. Even if only a small number of bits are changed in the underlying data, the fingerprint could be changed significantly. In some implementations of objects, once an object is created, normally it could be difficult to be changed even for a single bit. However, unlike files that often need an operating system of a computer to be accessed, objects may often be accessed directly from a data store and/or through API calls. This allows object storage to scale efficiently in light of various challenges in storing big data.

Between the warm-tier data store 130 and the cold-tier data store 135, there may be different requirements, natures, system structures, and storage architecture. A warm-tier data store 130 usually stores "warm-tier" data, which may be referring to data that is expected to be more frequently accessed or retrieved, such as backup snapshots that are recent and files that are active. Warm-tier data is easily retrieved from the warm-tier data store 130 by the remote server 120, the client-side server 115, and/or the client devices 110. A cold-tier data store 135 usually stores "cold-tier" data, which may be referring to data that is expected to be inactive or less frequently accessed or retrieved, such as old backup snapshots and inactive files. Cold-tier data may need to be "warmed-up" or "thawed" during retrieval, thus retrieval of cold-tier data takes longer (e.g., up to several days) compared to retrieval of warm-tier data. Older backup copies may be retained as cold-tier data for compliance, analytics, legal, or forensic purposes. For example, in an embodiment, cold-tier data store 135 may store data that has not been accessed or used for a long term period of time that may be predefined, e.g., one year or more. The warm-tier data store 130 may store data that has been accessed regularly in a time period less than the predefined long term period.

The warm-tier data store 130 and the cold-tier data store 135 are set up differently to respectively meet the usage expectation of the warm-tier data and cold-tier data. For example, since warm-tier data are expected to be active data, warm-tier data store 130 may be associated with more stringent recovery time objective (RTO) requirements, which may require a data management system to restore the data to a client device 110 within hours or even minutes. The use of cold-tier data usually has more relaxed RTO requirements, which may allow longer data retrieval latency such as in hours or even days. For example, a cold-tier data store 135 may use slower storage devices such as low-cost hard drives or tapes that may not be immediately accessible. In certain cases, the storage devices may need certain procedures, such as mitigation of data, or relocation of the storage devices, in order for the cold data stored in those storage devices to become accessible. The time spent for those procedures may be referred to as warm-up time or thaw time, which may also be referred to as the latency of the cold-tier data retrieval. Depending on the type of cold-tier data store 135, the latency can be hours or even days. Also, since certain procedures such as relocation of storage devices, may need to be performed, each data retrieval request of the cold-tier data store 135 may be higher in response time than the request for the warm-tier data store 130.

Whether a certain block of data or a certain snapshot corresponds to warm-tier or cold-tier may sometimes be set by the system administrator or operator of a client-side server 115 or the remote server 120. Within an organization, system administrators of client devices 110 may set forth the organization's warm/cold data policies and standards. Active backup data may be an example of warm-tier data while archival data may be an example of cold-tier data. The remote server 120 may manage the migration of data from a warm-tier data store 130 to a cold-tier data store 135 when the data turns from warm to cold. Depending on implementations, objective definitions on how data are classified as warm or cold may vary. For example, backup copies of data may be categorized as warm-tier data up to a certain short period of time (e.g., days, weeks, months, or years) or up to a cutoff time (e.g., December 31$^{st}$ of each year). Additionally, or alternatively, data may also be categorized as warm-tier data or cold-tier data based on the frequency of use, frequency of reference, types of files, and/or other suitable metrics.

The warm-tier data store 130 and the cold-tier data store 135 may also have different costs in terms of storage, read, and write requests. For example, in one embodiment, a warm-tier data store 130 may have lower read and write costs than a cold-tier data store 135 to allow frequent access of data in the warm-tier data store 130. In contrast, a cold-tier data store 135 may have a lower storage cost than the warm-tier data store 130 to allow long term storage of cold data in the cold-tier data store 135. Costs may be direct monetary costs to be spent to perform an action in the data store (e.g., read, write, store) or other costs such as computer resources and time in performing an action.

The warm-tier data store 130 and the cold-tier data store 135 may take different forms. They may also be referred to respectively as a first data store 130 and a second data store 135, or respectively as a backup data store 130 and an archive data store 135. In a first example, both data stores 130 and 135 are cloud data servers that are designed for different purposes. In one example embodiment, the warm-tier data store 130 may be AMAZON S3 and the cold-tier data store 135 may be AMAZON GLACIER, which may be tailored for longer term storage compared to AMAZON S3. In a second example, the warm-tier data store 130 may include faster storage units such as cloud data servers, hard drives, flash memories while the cold-tier data store 135 may include cheaper long-term storage units such as on-premises tape backup drives. In a third example, the warm-tier data store 130 and the cold-tier data store 135 may belong to the same storage system. The remote server 120 may simply designate a certain part of the storage system as warm-tier data store 130 and another part of the storage system as cold-tier data store 135. Other suitable combinations of different natures and architectures are also possible for the data stores 130 and 135.

The communications among the client devices 110, the client-side server(s) 115, the remote server(s) 120, and the data stores 130 and 135 may be transmitted via a network 140, for example, via the Internet. The network 140 provides connections to the components of the system environment 100 through one or more sub-networks, which may include any combination of local area and/or wide area networks, using both wired and/or wireless communication systems. In one embodiment, a network 140 uses standard communications technologies and/or protocols. For example, a network 140 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 140 may be represented using any suitable format, such as hypertext markup language (HTML), extensible markup language (XML), or JSON. In some embodiments, all or some of the communication links of a network 140 may be encrypted using any suitable technique or techniques such as secure sockets layer (SSL), transport layer security (TLS), virtual private networks (VPNs), Internet Protocol security (IPsec), etc. The network 140 also includes links and packet switching networks such as the Internet.

Example Client-Side Server Architecture

Figure 2:
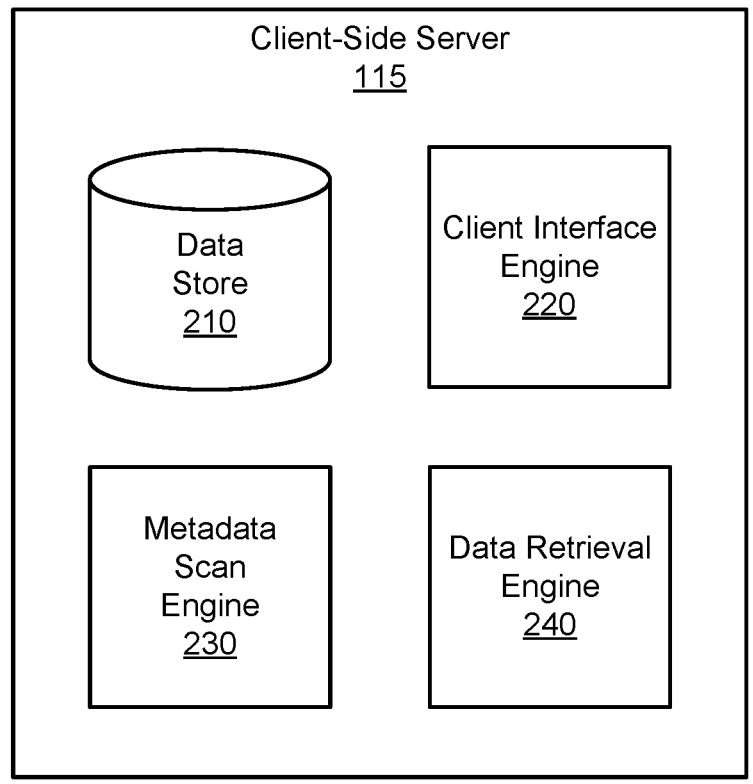
FIG. 2 is a block diagram illustrating the architecture of an example client-side server, in accordance with an embodiment.

FIG. 2 is a block diagram illustrating the architecture of an example client-side server 115, in accordance with an embodiment. Components of the client-side server 115 may be a combination of hardware and software and may include all or a subset of the example computing system illustrated and described with FIG. 6. The client-side server 115 may include a data store 210, a client interface engine 220, a metadata scan engine 230, and a data retrieval engine 240. In various embodiments, the client-side server 115 may include fewer and additional components that are not shown in FIG. 2. The functions of the client-side server 115 may be distributed among the components in a different manner than described. Also, even though in one embodiment data management functions are separated between the client-side server 115 and the remote server 120, in other embodiments those functions may be combined and be performed by a single data management server. In some embodiments, the functions and features associated with the client-side server 115 as discussed in FIG. 2 may also be included in the remote server 120, and vice versa.

The data store 210 stores data for use by the client-side server 115. Data in the data store 210 may include data restoration requests, state maps, metadata of data blocks, warm-tier data retrieval requests, cold-tier data retrieval requests, retrieved data blocks, historical restoration times, any other data relevant for use by the client-side server 115, or any combination thereof.

The client interface engine 220 may manage and operate interfaces for clients to restore their files and snapshots. In some embodiments, the client interface engine 220 may cause one or more client devices 110 to display a user interface. In one example, the client interface engine 220 may cause one or more client devices 110 to display a web user interface at the web browser of the client device 110. In some embodiments, the client interface engine 220 may control the content and information displayed on the user interface 114. For example, the client interface engine 220 may display files stored in the data stores 130 and 135 in the forms of graphical elements in the web user interface. The client may provide one or more data restoration requests via the user interface 114 to the client-side server 115. A data restoration request may include a plurality of files the client wants to restore on one or more client devices 110.

The metadata scan engine 230 may retrieve metadata corresponding to each file included in the data restoration requests. In an example, the metadata scan engine 230 may retrieve the metadata from the remote server 120 (e.g., from a metadata management engine 330 as described below). Metadata for a file may include namespace metadata for each data block associated with the file. The metadata for each data block may include a data block creation time (e.g., a timestamp when the data block was created during a backup), a data block size (e.g., a memory size), a data block checksum (e.g., a digit used for data deduplication), a storage tier identifier (e.g., a value or label identifying warm or cold), a cold-tier unit identifier (e.g., an address or path for a unit of storage in a cold-tier data store where the data block is stored), a back-up time (e.g., a timestamp when the data block was backed up), a last-use time (e.g., a timestamp when the data block was last used), and/or various other suitable metadata.

The metadata scan engine 230 scans the retrieved metadata of each data block to determine whether the data block corresponds to warm-tier data (e.g., the data block is a warm data block) or cold-tier data (e.g., the data block is a cold data block). For example, the metadata scan engine 230 determines a data block corresponds to cold-tier data when the data block's metadata includes a cold-tier unit identifier as the metadata for a warm data block will not include this piece of metadata. In another example, the metadata scan engine 230 determines a data block corresponds to cold-tier data when the data block's metadata includes a back-up time that takes place before a threshold period of time. In yet another example, the metadata scan engine 230 determines a data block corresponds to cold-tier data when the data block's metadata includes a last-use time that takes place before a threshold period of time.

The data retrieval engine 240 may retrieve any warm data blocks identified by the metadata scan engine 230. In one example, the data retrieval engine 240 sends a warm-tier data retrieval request via the network 140 to the one or more warm-tier data stores 130 to retrieve the data blocks. In another example, the data retrieval engine 240 may query the remote server 120 to retrieve the warm data blocks from the one or more warm-tier data stores 130. After the warm data blocks are retrieved, the data retrieval engine 240 restores the warm data blocks to the appropriate client devices. Simultaneous to the data retrieval engine 240 retrieving warm data blocks, the data retrieval engine 240 manages the retrieval of cold data blocks from one or more cold-tier data stores 135.

The data retrieval engine 240 may generate a state map for tracking retrieval of cold data blocks. For example, the data retrieval engine 240 may add any identified cold data blocks based on the metadata scan to a state map. The data retrieval engine 240 may additionally add metadata associated with each cold data block to the state map. For example, the data retrieval engine 240 may add metadata retrieved from the remote server 120 to the state map. In some embodiments, the data retrieval engine 240 may add a file identifier (e.g., a file name) associated with each cold data block to the state map. In some embodiments, the data retrieval engine 240 may backup the state map periodically to a warm-tier data store 130. The state map may be restored from the warm-tier data store 130 to the client-side server 115 as needed. For example, the client-side server 115 may experience an interruption (e.g., a crash) during the restoration process and be unable to determine the status of the retrieval of cold data blocks, as such the data retrieval engine 240 may restore the state map from the warm-tier data store 130.

The data retrieval engine 240 may query the remote server 120 to retrieve any cold data blocks that correspond to cold-tier. In some embodiments, the data retrieval engine 240 may determine to group queries based on the state map. For example, the data retrieval engine 240 may group together queries for cold data blocks associated with a same file identifier. In some embodiments, the data retrieval engine 240 may add a timestamp referring to a time the query took place for each cold data block to the state map.

The data retrieval engine 240 may determine a schedule for restoring cold data blocks to the client devices 110. The schedule allows the data retrieval engine 240 to track a time on the state map associated with when the cold data blocks are available for restore. In some embodiments, the schedule may be based on when the data restoration request for a file was received by the client-side server 115 and/or information in the state map. For example, an earlier received data restoration request for a first file may be scheduled for restore earlier than a later received data restoration request for a second file. In another example, the schedule may be based on the timestamp referring to when the query to the remote server 120 took place (as recorded in the state map) and an earlier timestamp may be scheduled for restore earlier than a later timestamp. In yet another example, the data retrieval engine 240 may determine the schedule based on historical restoration times of files and/or data blocks. For example, the data retrieval engine 240 may track how long cold data blocks take to retrieve. When future data restoration requests are received by the client-side server 115 that include a request to restore cold data blocks that have been previously restored, the data retrieval engine 240 may update the schedule to reflect the previous restoration time.

The data retrieval engine 240 may issue a call to restore the cold data blocks based on the schedule. For example, the data retrieval engine 240 may issue a GET call to the remote server 120 to determine if the cold data blocks are ready for restore (e.g., are the cold data blocks warmed-up or thawed). If cold data blocks are ready, the data retrieval engine 240 may restore the data blocks to the client device(s) 110. The data retrieval engine 240 may update the state map to identify the cold data blocks that have been restored.

The various engines and components shown in FIG. 2 may be a combination of hardware and software that includes instructions, when executed by hardware components such as one or more processors, to perform the functionality. Each engine may include all or a subset of the example computing system illustrated and described with FIG. 6.

Example Remote Server Architecture

Figure 3:
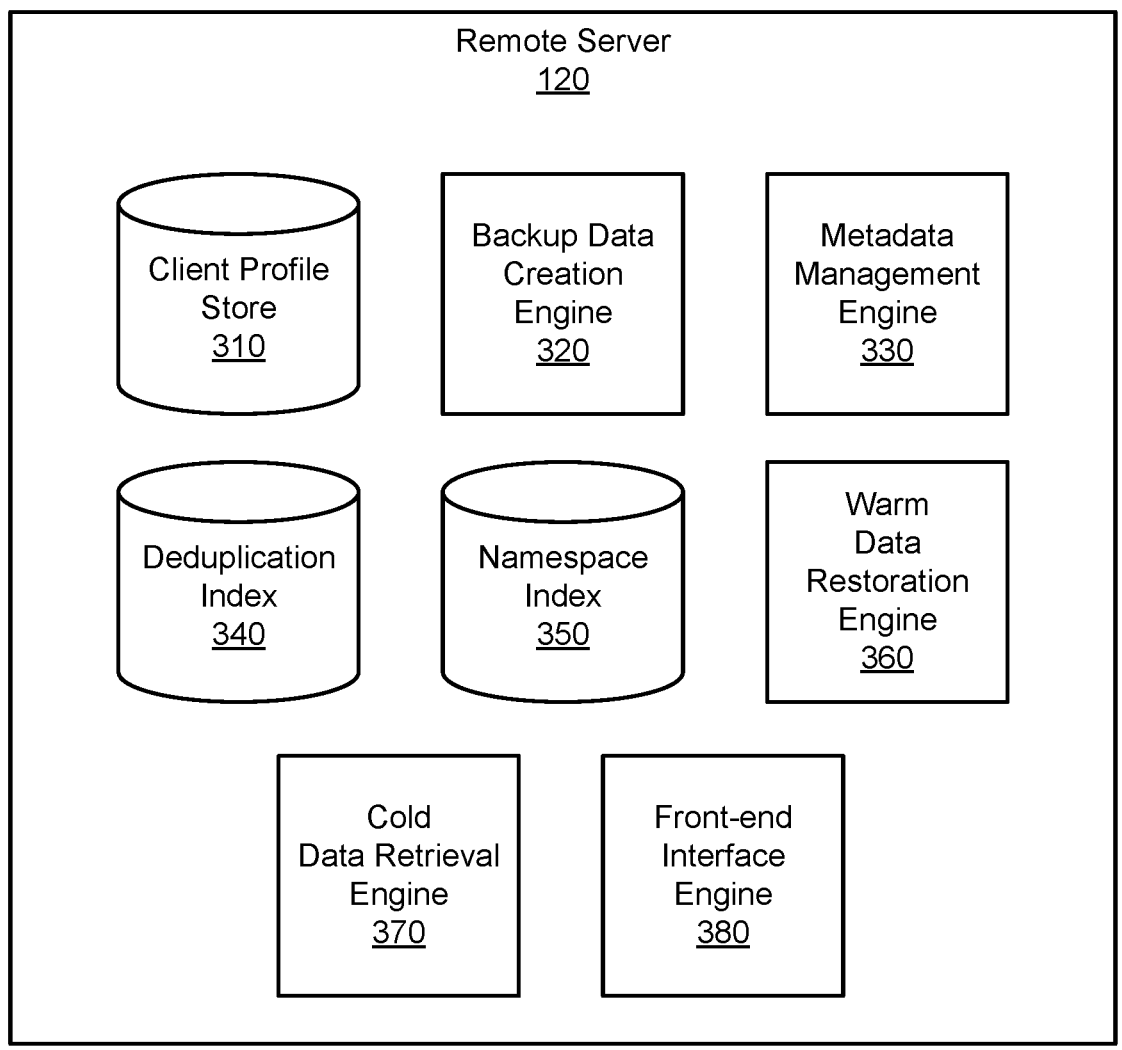
FIG. 3 is a block diagram illustrating the architecture of an example remote server, in accordance with an embodiment.

FIG. 3 is a block diagram illustrating the architecture of an example remote server 120, in accordance with an embodiment. Components of the remote server 120 may be a combination of hardware and software and may include all or a subset of the example computing system illustrated and described with FIG. 6. The remote server 120 may include a client profile store 310, a backup data creation engine 320, a metadata management engine 330, a deduplication index 340, a namespace index 350, a warm data restoration engine 360, a cold data retrieval engine 370, and a front-end interface engine 380. In various embodiments, the remote server 120 may include fewer and additional components that are not shown in FIG. 3. For example, in some embodiments, the warm-tier data store 130 and the cold-tier data store 135 may be part of the remote server 120. In other embodiments, the data stores 130 and 135 may be operated by an independent party such as a cloud storage provider. The functions of the remote server 120 may be distributed among the components in a different manner than described. In some embodiments, the remote server 120 manages the data stored in various data stores 130 and 135 and performs deduplication of data to reduce the storage space occupied in the data stores 130 and 135. In some embodiments, the remote server 120 and one or more data stores 130 and/or 135 may form a time-indexed deduplicated storage system.

The example structure of the remote server shown in FIG. 3 is only an example of remote server 120. In different embodiments, other variations of remote servers 120 may also be used. For example, the remote server 120 in FIG. 3 is shown as a time-indexed deduplicated storage system. However, in other embodiments, the storage system does not always need to perform deduplication or one or more features described in association with FIG. 3.

The client profile store 310 stores information of clients, which may include log-in credentials (e.g., usernames, user identifications, etc.), profile information of clients, information associated with client devices 110 (e.g., client device identifications, IP addresses, etc.) used by the clients, and information associated with client-side servers 115 (e.g., client-side server identifications, etc.). Each log-in account may be associated with a client identifier that uniquely identifies a client. For example, the user account name (or a version of the user account name such as a hash of the user account) may be used as the unique client identifier of the client. The client identifier may be used to identify data to which the client has access. In the namespace index 350, data entries corresponding to the data to which the client has access may include the client identifier so that the remote server 120 can control the access of data in one or more data stores 130 and 135. In some embodiments, each client profile in the client profile store 210 may also store any unit identifiers of data blocks to which the client has access.

The backup data creation engine 320 may create backups of data that are from the client devices 110 and upload the backup data to one or more data stores 130 and 135. A backup operation may be triggered by an action performed at a client device 110 or by an event, may be scheduled as a regular backup, or may be in response to an automated backup task initiated by the remote server 120 to a client device 110. In one embodiment, the backup data creation engine 320 may poll a client device 110 periodically and receive files to be backed up and corresponding file metadata, such as file names, file sizes, access time-stamps, access control information, and the like. The backup data creation engine 320 may store the files of the client devices 110 as data blocks in the warm-tier data store 130 until the data blocks become cold data. In one embodiment, the backup data creation engine 320 may perform incremental backup operations that leverage data from previous backup cycles to reduce the amount of data to store in creating snapshots. For example, after an initial full data capture, subsequent snapshots may be differential data compared to the previous snapshots.

The backup data captured from a client device 110 may take the form of snapshots. A backup snapshot may be a set of copies of files that reflect the state of a client device 110 at the capture time. For example, a snapshot may be an image of the storage (or a portion of the storage) of a client device 110 that is captured at a particular moment in time. The moment in time may be referred to as a checkpoint. A snapshot may be a complete image or an incremental image. For example, an initial backup of a device may generate a snapshot that captures a complete image of a set of files in a client device 110. Subsequent checkpoints may generate snapshots of incremental images that represent the differential changes of the client device 110. The backup snapshot may additionally include metadata associated with the files, such as timestamps of changes, timestamps of access, ACL checksums, attribute checksums, and other like metadata. In some embodiment, a snapshot may represent a volume (e.g., a partition of a storage device) of the client device 110. However, in other embodiments, a snapshot may only represent a portion of the client device 110 (e.g., a particular directory, a particular folder, or even a single file). The extent of file coverage of a snapshot may depend on the backup settings of individual client devices 110 and may be different among various client devices 110.

In one embodiment, a snapshot may be divided as data blocks that are saved in various different locations in a data store 130 or 135. A data block may be a set of bits that represent data of a file or multiple files. Files may be of various sizes compared to a data block. For example, a large file may include multiple data blocks while a single data block may contain data of a combination of various small files. Data of a file may be retrieved by the identifiers of data blocks (e.g., data blocks' addresses, checksums, etc.) and offsets of the starting and ending data blocks. Various individual data blocks of a snapshot may be stored in different locations of a data store 130 or 135 and sometimes may not be grouped. For example, some of the data blocks may be duplicated data that have already been uploaded from other client devices 110. Those data blocks may not need to be saved again in a data store. In some data stores 130 or 135, a data block may be started in a random location based on the checksum or another identifiable fingerprint of the data block (or the object containing the data block) as the address or identifier of the data block. Some data stores 130 or 135 use files as units to save the data instead of dividing files as data blocks that are fixed length. Hence, in some embodiments, the term data block may be used interchangeably with the term file.

The metadata management engine 330 manages various metadata of files stored in various data stores 130 and 135. A backup file may include different metadata regarding the profile information of the file, the namespace data of the data blocks, deduplication data of the data blocks, and other data regarding data structure, file management, access control, permission, etc. Profile metadata may include title, creator, keywords, and other related information of the file. In a cloud data store, a file may be initially uploaded by a client and subsequently uploaded by other clients. Instead of saving duplicate copies of the same files, the remote server 120 may add metadata to the file originally uploaded to allow access of the file by additional users. Profile metadata may also include sender, recipients, subject line, copy list, dates, etc. in cases of file types such as emails. The metadata management engine 330 may save various metadata in a structured format (e.g., SQL) for users and administrators to conduct search and retrieval of accessible data.

The metadata management engine 330 may receive a request from the client-side server 115 (e.g., from the metadata scan engine 230) to provide metadata for one or more files and/or snapshots (e.g., namespace data). The metadata management engine 330 identifies the appropriate metadata for each file and/or snapshot and provides the metadata to the client-side server 115 (e.g., to the metadata scan engine 230).

The deduplication index 340 may be a data store that includes one or more non-transitory computer readable storage media (e.g., memory) that store deduplication metadata of data blocks. A computer readable storage medium is a medium that does not include a transitory medium such as a propagating signal or a carrier wave. Deduplication index 340 stores deduplication metadata of various data blocks to identify copies of already saved files in a data store 130 or 135. When a client device 110 transmits a potentially new data block (e.g., a number of bits) to the remote server 120 to store at a data store, the remote server 120 may generate or receive the fingerprint of the data block. The fingerprint may be stored in the deduplication index 340. A fingerprint may represent a unique summary of the data block, which may sometimes be referred to as a message digest of the data block. The fingerprint may be derived by a checksum algorithm, a hash algorithm, or a fingerprint algorithm, depending on embodiments. For example, the algorithm may be a secure hash algorithm (SHA) or a message digest algorithm (MD). In one case, the fingerprint is a checksum of the data block. Based on the fingerprint, the server 120 examines the deduplication index 340 to determine whether the fingerprint is referenced in the deduplication index 340. For example, a fingerprint is referenced in the deduplication index 340 when the server 120 is able to locate an index entry that includes or is associated with the fingerprint. Other ways to reference the fingerprint in the deduplication index 340 is also possible. If the same data block has already been stored in a data store 130 or 135, instead of adding the same data block to the data store 130 or 135 twice, the remote server 120 might add an association between of the client and the index entry so that the deduplication index 340 has a record that the client is associated with the data block. In some embodiments, a data store may be an object storage system. The fingerprint of the data block may be used directly as the identifier and the address in an index entry to uniquely identify the data block.

The namespace index 350 may be another data store that includes one or more non-transitory computer readable storage media that store namespace metadata of data blocks. Namespace metadata of a data block may include a data block creation time (e.g., a timestamp when the data block was created during a backup), a data block size (e.g., a memory size), a data block checksum (e.g., a digit used for data deduplication), a storage tier identifier (e.g., a value or label identifying warm or cold), a cold-tier unit identifier (e.g., an address or path for a unit of storage in a cold-tier data store where the data block is being stored), and/or a storage time (e.g., a timestamp when the data block was stored in a cold-tier data store). Namespace metadata may also include a data block back-up time (e.g., a timestamp when the data block was backed up), a last-use time (e.g., a timestamp when the data block was last used), or various other suitable metadata.

A data block may also include namespace metadata specifically related to data deduplication and migration between a warm-tier data store 130 and a cold-tier data store 135. For example, in a deduplication data storage system, a common data block may be included in various snapshots of different client devices 110 that are unrelated. The remote server 120 may save the namespace metadata in the namespace index 350 and use the metadata to determine whether a data block is ready to be migrated from a warm-tier data store 130 to a cold-tier data store 135 and to determine whether a data block is ready to be deleted.

The warm data restoration engine 360 may provide restoration of data stored in the warm-tier data store 130 to a client device 110. In some embodiments, the warm data restoration engine 360 may receive a warm-tier data retrieval request from a client-side server 115. In some embodiments, the warm data restoration engine 360 may receive a warm-tier data retrieval request from a client device 110. The warm data restoration engine 360 may transmit backup snapshots or individual files to a client-side server 115 or a client device 110 when a client is restoring one or more files in case of events such as data loss, computer crash, version controls, or other data restoration events. In response to a request by a client to restore a file or to go back to a particular snapshot, the warm data restoration engine 360 may locate the relevant metadata and access the warm-tier data store 130 to identify data blocks that need to be restored based on the metadata. Each client may be associated with different restoration requirements (e.g., RTO requirements) and protocols. The warm data restoration engine 360 may restore the data for a client based on the requirements and protocols.

The cold data retrieval engine 370 may receive a plurality of queries to retrieve data stored in the cold-tier data store 135. In some embodiments, the queries for cold data blocks are provided to the cold data retrieval engine 370 by one or more client-side servers 115, by one or more client devices 110, or a combination thereof. The queries may be provided by various entities. For example, client devices 110 and/or client-side servers 115 corresponding to one entity and client devices 110 and/or client-side servers 115 corresponding to another entity may be providing queries to the remote server 120 for cold data blocks.

The cold data retrieval engine 370 may stage the queries for a predetermined amount of time (e.g., for 12 hours, 48 hours, etc. after receiving the query). During the staging, the cold data retrieval engine 370 may group the cold data blocks included in the queries based in part on metadata of the cold data blocks (e.g., based in part on storage times of the cold data blocks). For example, each group of cold data blocks may include cold data blocks with overlapping storage times. In another example, each group of cold data blocks may include cold data blocks with storage times within a predetermined time range of each other. A data retrieval request for a group of cold data may combine cold data from various client devices 110. For example, in one case, an organization may have multiple client devices 110 that are undergoing data restoration within a similar time frame. The retrieval of cold data associated with different client devices 110 may be combined. In another case, the remote server 120 may also combine the retrieval of cold data associated with different organizations in a group.

For each group of cold data blocks, the cold data retrieval engine 370 may generate a cold-tier data retrieval request. The cold data retrieval engine 370 may provide the cold-tier data retrieval request to the cold-tier data stores 135 in a time-order fashion. For example, the cold data retrieval engine 370 may generate a time-ordered index for the cold-tier data retrieval requests using a key-value pair. The storage time may serve as the key while the cold-tier unit identifier may be the value of a particular key-value pair. In some embodiments, the cold data retrieval engine 370 performs a deduplication on the key-value pairs in the time-order index. By doing so, the cold data retrieval engine 370 removes overlapping cold-tier data retrieval requests further reducing the number of cold-tier data retrieval requests provided to the cold-tier data stores 135.

The cold data retrieval engine 370 may retrieve the cold data blocks by batches corresponding to the cold-tier data retrieval requests. In some embodiments, the cold data retrieval engine 370 attempts to retrieve a batch of cold data blocks after a wait time (e.g., 12 hours, 48 hours, etc.) after the cold-tier data retrieval requests are sent to the cold-tier data store 135. In some embodiments, a particular batch of cold data blocks may be unable to be retrieved at a first time (e.g., after the wait time is reached). Responsive to the unsuccessful attempt to retrieve the particular cold data blocks, the cold data retrieval engine 370 may wait until a later time to re-attempt to retrieve the particular batch of cold data blocks. A time interval between the first time and the later time is optimized such that the batch is successfully retrieved at the later time. In some embodiments, the time interval may be based on the wait time, based on historical time interval data, or a combination thereof. For example, if the wait time is 12 hours, the time interval may be 10% of the wait time, so 1.2 hours. In this example, the cold data retrieval engine 370 re-attempts to retrieve the particular batch of cold data blocks from the cold-tier data store 135 after 13.2 hours have passed since the cold-tier data retrieval request was sent to the cold-tier data store 135. In another example, the cold data retrieval engine 370 tracks historical time interval data that tracks time intervals corresponding to successful retrievals of particular batches of cold data blocks during re-attempts. In this example, the cold data retrieval engine 370 re-attempts to retrieve a particular batch of cold data blocks from the cold-tier data store 135 after a historic time interval has passed since the cold-tier data retrieval request was sent to the cold-tier data store 135. In some embodiments, the cold data retrieval engine 370 creates a temporary copy of each retrieved cold data block in the warm-tier data store 130. Future queries may include cold data blocks that match cold data blocks stored in the warm-tier data store 130, as such, the cold data retrieval engine 370 may retrieve these particular cold data blocks in less time as cold-tier data retrieval requests for these cold data blocks do not need to be provided to the cold-tier data store 135.

The front-end interface engine 380 may manage and operate front-end interfaces for clients to manage their files and snapshots. For example, the front-end interface engine 380 may provide a web user interface. When a client visits and logs on to the website of the remote server 120, the front-end interface engine 380 may cause the client device 110 or a client-side server 115 to display a web user interface at the web browser of the client device 110 or the client-side server 115. The front-end interface engine 380 may control the content and information displayed on the website. The front-end interface engine 380 may display files stored in the data stores 130 and 135 in the forms of graphical elements in the web user interface. In another example, the front-end interface engine 380 may communicate with and control a user interface of an application that runs at the client device 110 to control the content and information of the application. The company operating the remote server 120 may publish the application that is installed at the client device 110 or the client-side server 115. The client may manage files through the user interface of the application. In yet another example, the front-end interface engine 380 may maintain an interface in the form of an application program interface (API) for the client devices 110 or the client-side server 115 to communicate with the server 120. The front-end interface engine 380 may also provide customer support services, such as authentication management and maintaining of client preferences.

The various engines and components shown in FIG. 3 may be a combination of hardware and software that includes instructions, when executed by hardware components such as one or more processors, to perform the functionality. Each engine may include all or a subset of the example computing system illustrated and described with FIG. 6.

Example Data Restoration Processes

FIG. 4 is a flowchart depicting an example process 400 for restoring data from different storage tiers in a data management system, in accordance with an example embodiment. The process 400 may be performed to restore data to one or more client devices 110. In some embodiments, the process 400 may be performed by the client-side server 115, the remote server 120, or a combination of both. As such, a data management server will be referred to as performing the steps of process 400 with the data management server representing either the client-side server 115 or the remote server 120. Other entities may perform some or all of the steps in FIG. 4 in other embodiments. Embodiments may include different and/or additional steps, or performance of the steps in different orders.

The data management server may receive 410 one or more data restoration requests for restoring a plurality of data blocks. In some embodiments, the data management server may receive data restoration requests from a client device 110 or from more than one client device 110. For example, a client-side server 115 may receive data restoration requests from multiple client devices 110 associated with a client-side server 115 within an organization. In some embodiments, the remote server 120 may also process data restorations requests from different organizations together using the process 400. Each data restoration request may include a plurality of files the client wants to restore on a client device 110. The data management server may identify a plurality of data blocks associated with each file of the plurality of files included in the data restoration requests based on metadata of each file.

The data management server may determine 420 a first subset of warm data blocks corresponding to warm-tier data and a second subset of cold data blocks corresponding to cold-tier data by delineating data in the one or more data restoration requests into warm-tier data and cold-tier data. By way of example, the data management server may determine whether a particular data block belongs to the first subset or second subset based on metadata associated with the data block. For example, the data management server may retrieve and scan each block's metadata, which may be stored in namespace index 350 and managed by metadata management engine 330. The type of metadata that may determine whether a data block is warm or cold may depend on the embodiment. In one embodiment, the metadata may be an identifier that specifies the tier of the data block. For example, during the scan of metadata for a data block, the data management server determines if the metadata includes a cold-tier unit identifier or not. If the metadata for a data block includes the cold-tier unit identifier, the data management server determines that particular data block to correspond to cold-tier (e.g., the data block is a cold data block in the second subset). If the metadata for a data block does not include the cold-tier unit identifier, the data management server determines that particular data block to correspond to warm-tier (e.g., the data block is a warm data block in the first subset). In one embodiment, the type of metadata that determines the tier of the data block may be the back-up time. For example, a data block that is backed up before a threshold period of time is classified as cold data. In yet another embodiment, the type of metadata that determines the tier of the data block may be the last-use time for the data block. A data block that is used before a threshold period of time is classified as cold data. Other metadata, or a combination of various metadata, may also be used.

The data management server may retrieve 430 the warm data blocks in the first subset. The data management server may provide a warm-tier data retrieval request to the warm-tier data store 130 to retrieve the warm data blocks in the first subset. The data management server may receive the warm data blocks from the warm-tier data store 130. The data management server may restore 440 the warm data blocks in the first subset to one or more client devices 110 corresponding to the data restoration request that included the warm data blocks.

The data management server may group 450 the cold data blocks based in part on storage time of the cold data blocks to generate a plurality of cold-tier data retrieval requests. In one example, a cold-tier data retrieval request may be associated with a group of cold data blocks with overlapping storage times. In another example, a cold-tier data retrieval request may be associated with a group of cold data blocks with storage times within a predetermined time range of each other. In some embodiments, the data management server may group the cold data blocks simultaneously while retrieving and restoring the warm data blocks.

The data management server may retrieve 460 the cold data blocks by batches. Each batch may correspond to one of the cold-tier data retrieval requests. The data management server may restore 470 the cold data blocks in the second subset to one or more client devices 110 corresponding to the data restoration request that included the warm data blocks.

Example First and Second Pass for Data Restoration

Figure 5A:
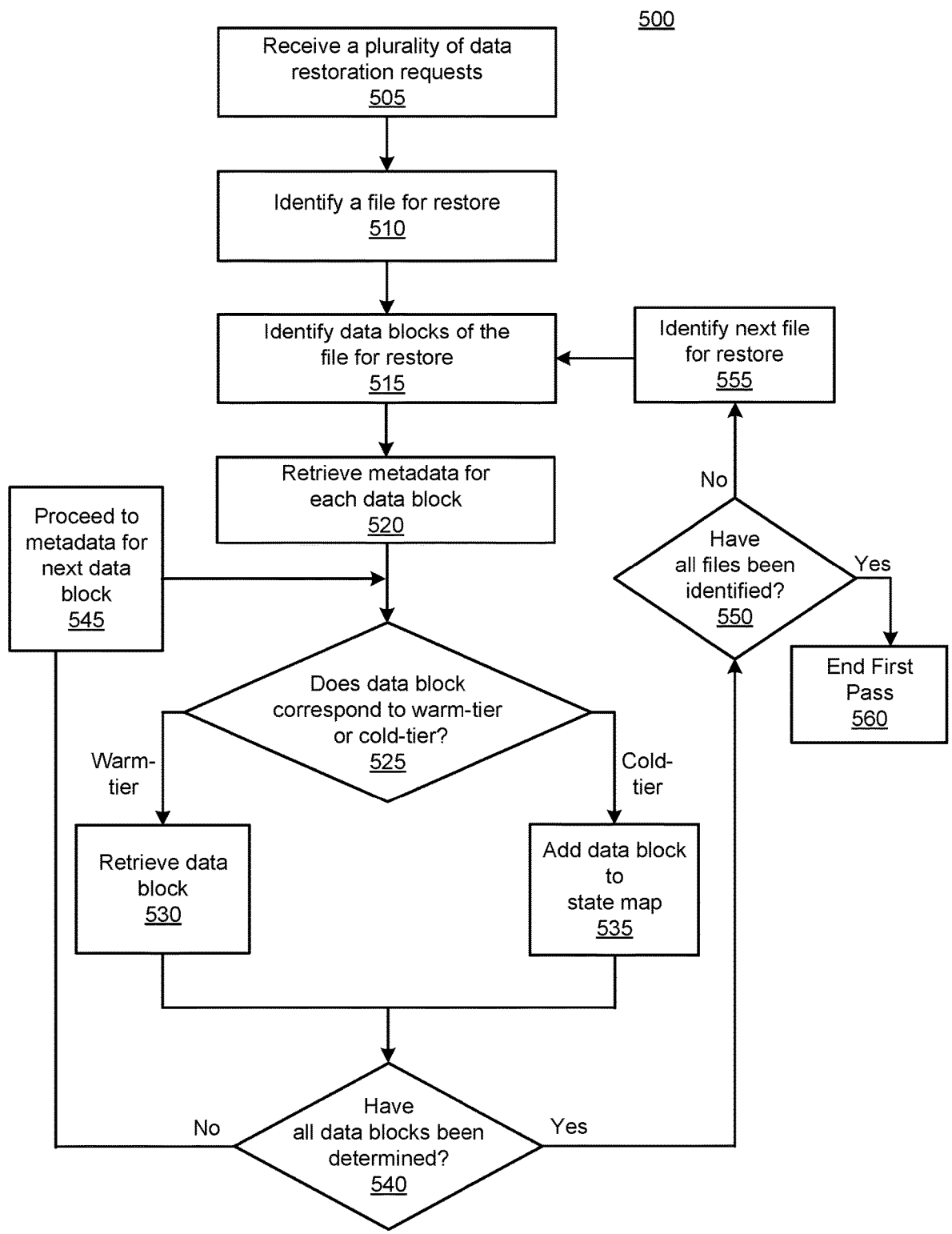
FIG. 5A is a flowchart depicting a first pass for restoring data, in accordance with an embodiment.

FIG. 5A is a flowchart depicting a first pass 500 for restoring data, in accordance with an embodiment. In some embodiments, the first pass 500 is performed by a client-side server 115 in communication with the client devices 110 and the remote server 120. In alternative embodiments, the first pass 500 is performed by the remote server 120 in communication with the client devices 110. For simplicity in the following description, a data management server will be referred to as performing the steps with the server representing either the client-side server 115 or the remote server 120. Embodiments may include different and/or additional steps, or performance of the steps in different orders.

The data management server may receive 505 a plurality of data restoration requests from one or more client devices 110. A data restoration request may include a plurality of files the client wants to restore on one or more client devices 110. The data management server may identify 510 a file for restore of the plurality of files and may identify 515 one or more data blocks of the file for restore. For example, the data management server may identify the one or more data blocks based on metadata of the file.

The data management server may retrieve 520 metadata for each data block. The metadata for each data block may include a data block creation time, a data block size, a data block checksum, a storage tier identifier, and/or a cold-tier unit identifier.

The data management server may determine 525 if a data block corresponds to warm-tier or cold-tier. For example, the data management server may scan the metadata for each data block. During the scan of metadata for a data block, the data management server determines if the metadata includes the cold-tier unit identifier or not. If the data block corresponds to warm-tier, the data management server may retrieve 530 the data block. For example, if the metadata for the particular data block does not include the cold-tier unit identifier, the data management server determines the data block to correspond to warm-tier. The data management server may transmit a warm-tier data retrieval request to a warm-tier data store 130 to retrieve the corresponding warm data block. If the data block corresponds to cold-tier, the data management server may add 535 the data block to a state map. For example, if the metadata for the particular data block does include the cold-tier unit identifier, the data management server determines the data block to correspond to cold-tier. The data management server may add the corresponding cold data block to the state map.

The data management server may determine 540 if all the data blocks of the file have been determined to correspond with either warm-tier or cold-tier. If not, the data management server may proceed 545 to metadata for a next data block of the file and determine 525 if the data block corresponds to warm-tier or cold-tier. If so, the data management server may determine 550 if all files of the data restoration request have been identified. If not, the data management server may identify 555 a next file of the plurality of files for restore and repeat steps 515-540 for the next file. If so, the data management server may end 560 first pass. For example, the data management server may end the first pass 500 and proceed to a second pass discussed in FIG. 5B.

Figure 5B:
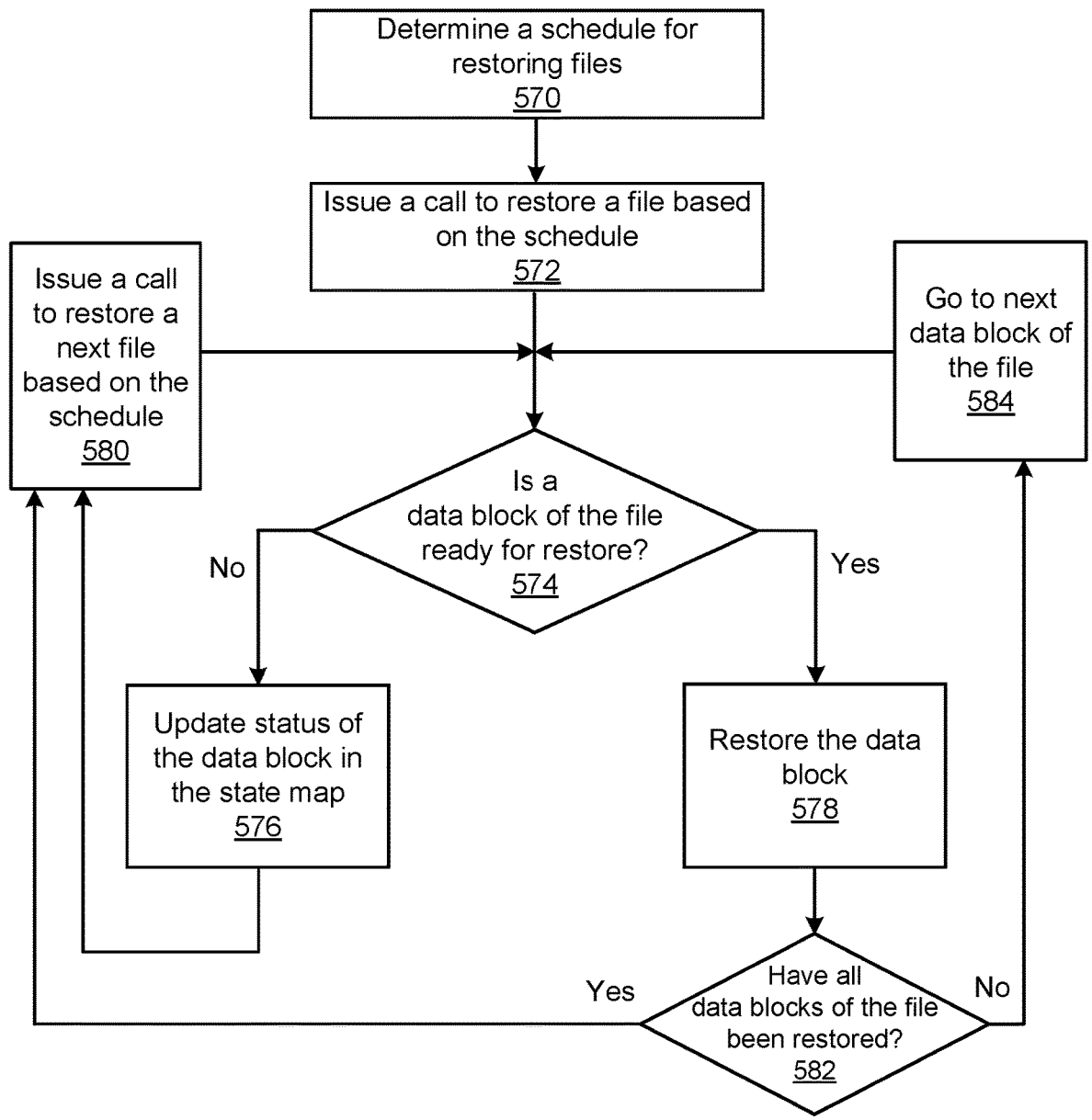
FIG. 5B is a flowchart depicting a second pass for restoring data, in accordance with an embodiment.

FIG. 5B is a flowchart depicting the second pass 590 for restoring data, in accordance with an embodiment. Similar to the first pass 500, the second pass 590 is performed by either the client-side server 115 or the remote server 120 (hereinafter, referred to as "data management server" for simplicity) in communication with the client devices 110. The second pass 590 operations refer to files and/or data blocks associated with the cold-tier. Embodiments may include different and/or additional steps, or performance of the steps in different orders.

In some embodiments, in between the first pass 500 and the second pass 590, the data management server may transmit cold-tier data retrieval requests to the cold-tier data store 135. This is discussed in more detail above in FIG. 3.

The data management server may determine 570 a schedule for restoring files. The schedule allows the data management server to track a time on the state map associated with when the cold data blocks are available for restore. In some embodiments, the schedule may be based on when the data restoration request for a file was received by the data management server and/or information in the state map. In some embodiments, the data management server may determine the schedule based on a predetermined wait time (e.g., 12 hours, 48 hours, etc.). In some embodiments, the data management server may determine the schedule based on historical restoration times of files.

The data management server may issue 572 a call to restore a file based on the schedule. For example, the data management server may issue a GET call, a DOWNLOAD call, or a HEAD call for the file. After the call to restore the file, the data management server may determine 574 if a data block of the file is ready for restore. If the data block is not ready, the data management server may update 576 the status of the data block in the state map and may issue 580 a call to restore a next file based on the schedule. Then, the data management server repeats step 574. If the data block is ready, the data management server may restore 578 the data block. The data management server may determine 582 if all data blocks of the file have been restored. If so, the data management server may issue 580 a call to restore a next file based on the schedule. Then, the data management server repeats step 574. If not, the data management server goes 584 to the next data block of the file and repeats step 574.

Computing Machine Architecture

Figure 6:
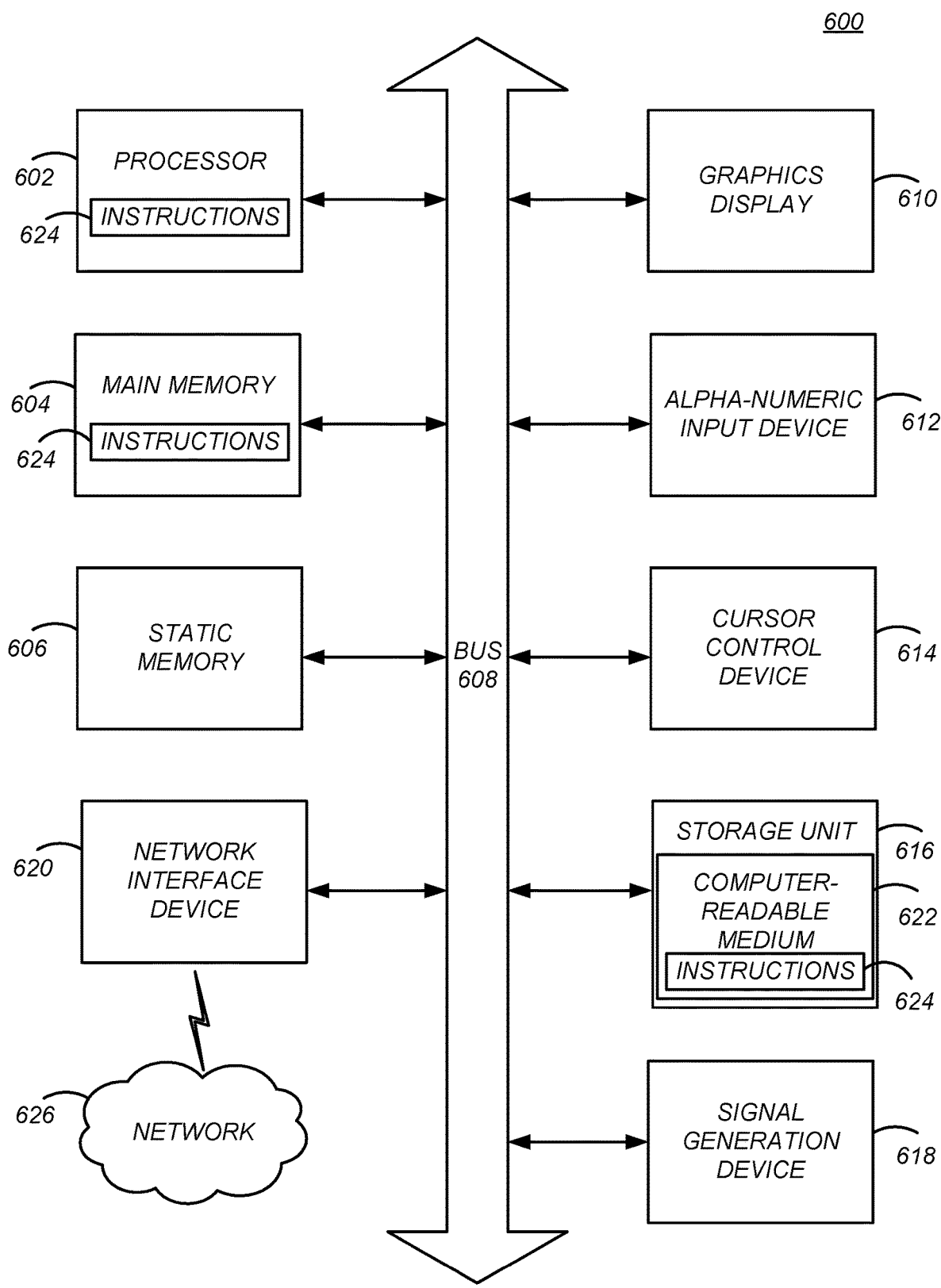
FIG. 6 is a block diagram illustrating components of an example computing machine, in accordance with an embodiment.

FIG. 6 is a block diagram illustrating components of an example computing machine that is capable of reading instructions from a computer readable medium and execute them in a processor. A computer described herein may include a single computing machine shown in FIG. 6, a virtual machine, a distributed computing system that includes multiples nodes of computing machines shown in FIG. 6, or any other suitable arrangement of computing devices.

By way of example, FIG. 6 shows a diagrammatic representation of a computing machine in the example form of a computer system 600 within which instructions 624 (e.g., software, program code, or machine code), which may be stored in a computer readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 6 may correspond to any software, hardware, or combined components shown in FIGS. 1, 2, and 3, including but not limited to, the client device 100, the client-side server 115, the remote server 120, and various engines, interfaces, terminals, and machines shown in FIGS. 2 and 3. While FIG. 6 shows various hardware and software elements, each of the components described in FIGS. 1, 2, and 3 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 624 that specify actions to be taken by that machine. Further, while only a single machine is illustrated, the term "machine" and "computer" also may be taken to include any collection of machines that individually or jointly execute instructions 624 to perform any one or more of the methodologies discussed herein.

The example computer system 600 includes one or more processors 602 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 600 also may include main memory 604 that store computer code including instructions 624 that may cause the processors 602 to perform certain actions when the instructions are executed, directly or indirectly by the processors 602. Memory 604 may be any storage devices including non-volatile memory, hard drives, and other suitable storage devices. Instructions 624 can be any directions, commands, or orders that may be stored in different forms, such as equipment-readable instructions, programming instructions including source code, and other communication signals and orders. Instructions 624 may be used in a general sense and are not limited to machine-readable codes.

One and more methods described herein improve the operation speed of the processors 602 and reduces the space required for the memory 604. For example, the architecture and methods described herein reduce the complexity of the computation of the processors 602 by applying one or more novel techniques that simplify the steps generating results of the processors 602 and reduce the cost of using various data stores 130 and 135. The algorithms described herein also reduce the storage space requirement for main memory 604.

The performance of certain of the operations may be distributed among the more than processors 602, not only residing within a single machine, but deployed across a number of machines. In some example embodiments, the one or more processors 602 or processor-implemented modules may be located in a single geographic location (e.g., within a home environment, an office environment, or a server farm). In other example embodiments, the one or more processors 602 or processor-implemented modules may be distributed across a number of geographic locations. Even though the specification or the claims may refer to some processes being performed by a processor 602, this should be construed to include a joint operation of multiple distributed processors.

The computer system 600 may include a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The graphics display unit 610, controlled by the processors 602, displays a graphical user interface (GUI) to display one or more results and data generated by the processes described herein. The computer system 600 also may include an alphanumeric input device 612 (e.g., a keyboard), a cursor control device 614 (e.g., a mouse, a trackball, a joystick, a motion sensor, or other pointing instrument), a storage unit 616 (e.g., a hard drive, a solid-state drive, a hybrid drive, a memory disk, etc.), a signal generation device 618 (e.g., a speaker), and a network interface device 620, which also are configured to communicate via the bus 608.

The storage unit 616 includes a computer readable medium 622 on which is stored instructions 624 embodying any one or more of the methodologies or functions described herein. The instructions 624 also may reside, completely or at least partially, within the main memory 604 or within the processor 602 (e.g., within a processor's cache memory) during execution thereof by the computer system 600, the main memory 604 and the processor 602 also constituting computer readable media. The instructions 624 may be transmitted or received over a network 626 (e.g., the network 140) via the network interface device 620.

While computer readable medium 622 is shown in an example embodiment to be a single medium, the term "computer readable medium" should be taken to include a single medium or multiple media (e.g., a centralized or distributed database, or associated caches and servers) able to store instructions (e.g., instructions 624). The computer readable medium may include any medium that is capable of storing instructions (e.g., instructions 624) for execution by the processors (e.g., processors 602) and that causes the processors to perform any one or more of the methodologies disclosed herein. The computer readable medium may include, but not be limited to, data repositories in the form of solid-state memories, optical media, and magnetic media. The computer readable medium does not include a transitory medium such as a propagating signal or a carrier wave.

ADDITIONAL CONSIDERATIONS

Beneficially, the systems and processes described herein improve the efficiency and reduce the cost of restoring data in a data management system. Various organizations and enterprises often have different data backup, retention, and restoration requirements and may rely on a third-party cloud-based data management system to manage data. The data management systems may be multi-tiered with data belonging to most recent files or snapshots in a warm-tier storage and older files or snapshots in a cold-tier storage. Retrieval and restoration of data from the warm-tier storage may be performed easily and quickly, whereas retrieval and restoration of data from the cold-tier storage is more challenging (e.g., more expensive and time consuming). A data management system efficiently and successfully restores data including warm-tier data and cold-tier data simultaneously by grouping the cold data based on storage time among various customers to generate fewer cold-tier data retrieval requests which significantly reduces the number of random retrieval requests submitted to cold-tier storage.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method comprising:
   receiving one or more data restoration requests for restoring a plurality of data blocks;
   determining, based on metadata associated with the data blocks, a first subset of warm data blocks corresponding to warm-tier data and a second subset of cold data blocks corresponding to cold-tier data;
   retrieving the warm data blocks in the first subset;
   restoring the warm data blocks in the first subset;
   grouping the cold data blocks based in part on storage times of the cold data blocks to generate a plurality of cold-tier data retrieval requests;
   retrieving the cold data blocks by batches, each batch corresponding to one of the cold-tier data retrieval requests; and
   restoring the cold data blocks in the second subset.

2. The computer-implemented method of claim 1, wherein the metadata associated with a data block corresponding to cold-tier data includes a cold-tier unit identifier.

3. The computer-implemented method of claim 1, wherein grouping the cold data blocks based in part on storage times of the cold data blocks to generate a plurality of cold-tier data retrieval requests comprises determining an index based on key value pairs associated with the cold data blocks, wherein a key value pair for a cold data block includes a storage time and a cold-tier unit identifier.

4. The computer-implemented method of claim 1, wherein receiving one or more data restoration requests for restoring the plurality of data blocks comprises receiving a first data restoration request from a first client device and a second data restoration request from a second client device, the first client device associated with a first entity and the second client device associated with a second entity, wherein the first entity is different from the second entity.

5. The computer-implemented method of claim 1, wherein receiving one or more data restoration requests for restoring the plurality of data blocks comprises receiving at least a first data restoration request to restore a first plurality of data blocks and a second data restoration request to restore a second plurality of data blocks, the method further comprising:
   deduplicating one of the first data restoration request or the second data restoration request.

6. The computer-implemented method of claim 1, further comprising tracking a time on a state map when the cold data blocks are available for restore.

7. The computer-implemented method of claim 6, wherein the state map is periodically backed up to a warm-tier data store.

8. The computer-implemented method of claim 1, further comprising creating a temporary copy of each cold data block in a warm-tier data store after the cold data block is retrieved.

9. The computer-implemented method of claim 1, wherein a cold-tier data retrieval request of the plurality of cold-tier data retrieval requests is associated with a group of cold data blocks, and the method further comprising:
   transmitting the cold-tier data retrieval request to retrieve the group of cold data blocks from a cold-tier data store.

10. The computer-implemented method of claim 1, wherein responsive to a particular batch of the cold data blocks being unable to be retrieved at a first time, the method further comprising:
    waiting to retrieve the particular batch of cold data blocks until a later time; and
    retrieving the particular batch of cold data blocks at the later time.

11. A non-transitory computer readable medium storing computer code comprising instructions that, when executed by at least one processor, cause the at least one processor to:
    receive one or more data restoration requests for restoring a plurality of data blocks;
    determine, based on metadata associated with the data blocks, a first subset of warm data blocks corresponding to warm-tier data and a second subset of cold data blocks corresponding to cold-tier data;
    retrieve the warm data blocks in the first subset;
    restore the warm data blocks in the first subset;
    group the cold data blocks based in part on storage times of the cold data blocks to generate a plurality of cold-tier data retrieval requests;
    retrieve the cold data blocks by batches, each batch corresponding to one of the cold-tier data retrieval requests; and
    restore the cold data blocks in the second subset.

12. The non-transitory computer readable storage medium of claim 11, wherein the metadata associated with a data block corresponding to cold-tier data includes a cold-tier unit identifier.

13. The non-transitory computer readable storage medium of claim 11, wherein the instruction to group the cold data blocks based in part on storage times of the cold data blocks to generate a plurality of cold-tier data retrieval requests comprises instructions to:
    determine an index based on key value pairs associated with the cold data blocks, wherein a key value pair for a cold data block includes a storage time and a cold-tier unit identifier.

14. The non-transitory computer readable storage medium of claim 11, wherein the instruction to receive one or more data restoration requests for restoring a plurality of data blocks comprises instructions to:
    receive a first data restoration request from a first client device and a second data restoration request from a second client device, the first client device associated with a first entity and the second client device associated with a second entity, wherein the first entity is different from the second entity.

15. The non-transitory computer readable storage medium of claim 11, wherein the instruction to receive one or more data restoration requests for restoring the plurality of data blocks comprises instructions to receive at least a first data restoration request to restore a first plurality of data blocks and a second data restoration request to restore a second plurality of data blocks, and the instructions further cause the at least one processor to:
    deduplicate one of the first data restoration request or the second data restoration request.

16. The non-transitory computer readable storage medium of claim 11, the instructions further cause the at least one processor to:
    track a time on a state map when the cold data blocks are available for restore.

17. The non-transitory computer readable storage medium of claim 11, the instructions further cause the at least one processor to:
    create a temporary copy of each cold data block in a warm-tier data store after the cold data block is retrieved.

18. The non-transitory computer readable storage medium of claim 11, wherein a cold-tier data retrieval request of the plurality of cold-tier data retrieval requests is associated with a group of cold data blocks, and the instructions further cause the at least one processor to:
    transmit the cold-tier data retrieval request to retrieve the group of cold data blocks from a cold-tier data store.

19. The non-transitory computer readable storage medium of claim 11, wherein responsive to a particular batch of the cold data blocks being unable to be retrieved at a first time, the instructions further cause the at least one processor to:
    wait to retrieve the particular batch of cold data blocks until a later time; and
    retrieve the particular batch of cold data blocks at the later time.

20. A system comprising:
a data management server comprising a processor and memory, the memory configured to store computer code comprising instructions, wherein the instructions, when executed by the processor, cause the processor to:
    receive one or more data restoration requests for restoring a plurality of data blocks;
    determine, based on metadata associated with the data blocks, a first subset of warm data blocks corresponding to warm-tier data and a second subset of cold data blocks corresponding to cold-tier data;
    retrieve the warm data blocks in the first subset;
    restore the warm data blocks in the first subset;
    group the cold data blocks based in part on storage times of the cold data blocks to generate a plurality of cold-tier data retrieval requests;
    retrieve the cold data blocks by batches, each batch corresponding to one of the cold-tier data retrieval requests; and
    restore the cold data blocks in the second subset.

\* \* \* \* \*